United States Patent
Lindoff et al.

(10) Patent No.: US 9,002,346 B2
(45) Date of Patent: Apr. 7, 2015

(54) TECHNIQUE FOR MANAGING MEASUREMENTS FOR MULTIPLE SUBSCRIPTIONS IN A MOBILE TERMINAL

(75) Inventors: Bengt Lindoff, Bjärred (SE); Bo Lincoln, Lund (SE); Johan Nilsson, Höllviken (SE); Christer Östberg, Staffanstorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 73 days.

(21) Appl. No.: 13/876,409

(22) PCT Filed: Sep. 20, 2011

(86) PCT No.: PCT/EP2011/066270
§ 371 (c)(1),
(2), (4) Date: May 16, 2013

(87) PCT Pub. No.: WO2012/041735
PCT Pub. Date: Apr. 5, 2012

(65) Prior Publication Data
US 2013/0231104 A1    Sep. 5, 2013

Related U.S. Application Data

(60) Provisional application No. 61/393,085, filed on Oct. 14, 2010.

(30) Foreign Application Priority Data

Oct. 1, 2010  (EP) .................................. 10012978

(51) Int. Cl.
| | | |
|---|---|---|
| H04W 88/02 | (2009.01) | |
| H04W 24/02 | (2009.01) | |
| H04W 48/16 | (2009.01) | |
| H04W 8/20 | (2009.01) | |
| H04W 36/00 | (2009.01) | |

(52) U.S. Cl.
CPC .............. *H04W 24/02* (2013.01); *H04W 48/16* (2013.01); *H04W 8/205* (2013.01); *H04W 36/0088* (2013.01)

(58) Field of Classification Search
USPC ............................................... 455/422.1, 466
See application file for complete search history.

(56) References Cited

U.S. PATENT DOCUMENTS

| | | | |
|---|---|---|---|
| 7,453,912 B2 | 11/2008 | Laroia et al. | |
| 7,626,956 B2 | 12/2009 | Palenius et al. | |
| 2008/0182580 A1 | 7/2008 | Laroia et al. | |
| 2009/0093217 A1 | 4/2009 | Shin | |
| 2009/0215452 A1 | 8/2009 | Balasubramanian et al. | |
| 2009/0312020 A1* | 12/2009 | Lee ............................ | 455/435.2 |

FOREIGN PATENT DOCUMENTS

| | | |
|---|---|---|
| CN | 101198136 A | 6/2008 |
| CN | 101217743 A | 7/2008 |
| WO | 03101140 A1 | 12/2003 |

* cited by examiner

*Primary Examiner* — Diane Mizrahi
(74) *Attorney, Agent, or Firm* — Murphy Bilak & Homiller, PLLC

(57) ABSTRACT

A technique for managing measurements for at least two subscriptions in a mobile terminal is described. A method implementation of this technique performed in the mobile terminal comprises the steps of determining a common carrier set being an intersection between the first carrier set associated with a first subscription and the second carrier set associated with at least one second subscription, performing a first measurement on the first carrier set, and the second measurement on the second carrier set excluding the common carrier set, and mapping results associated with the first measurement of the first subscription relating to the common carrier set to the at least one second subscription.

23 Claims, 4 Drawing Sheets

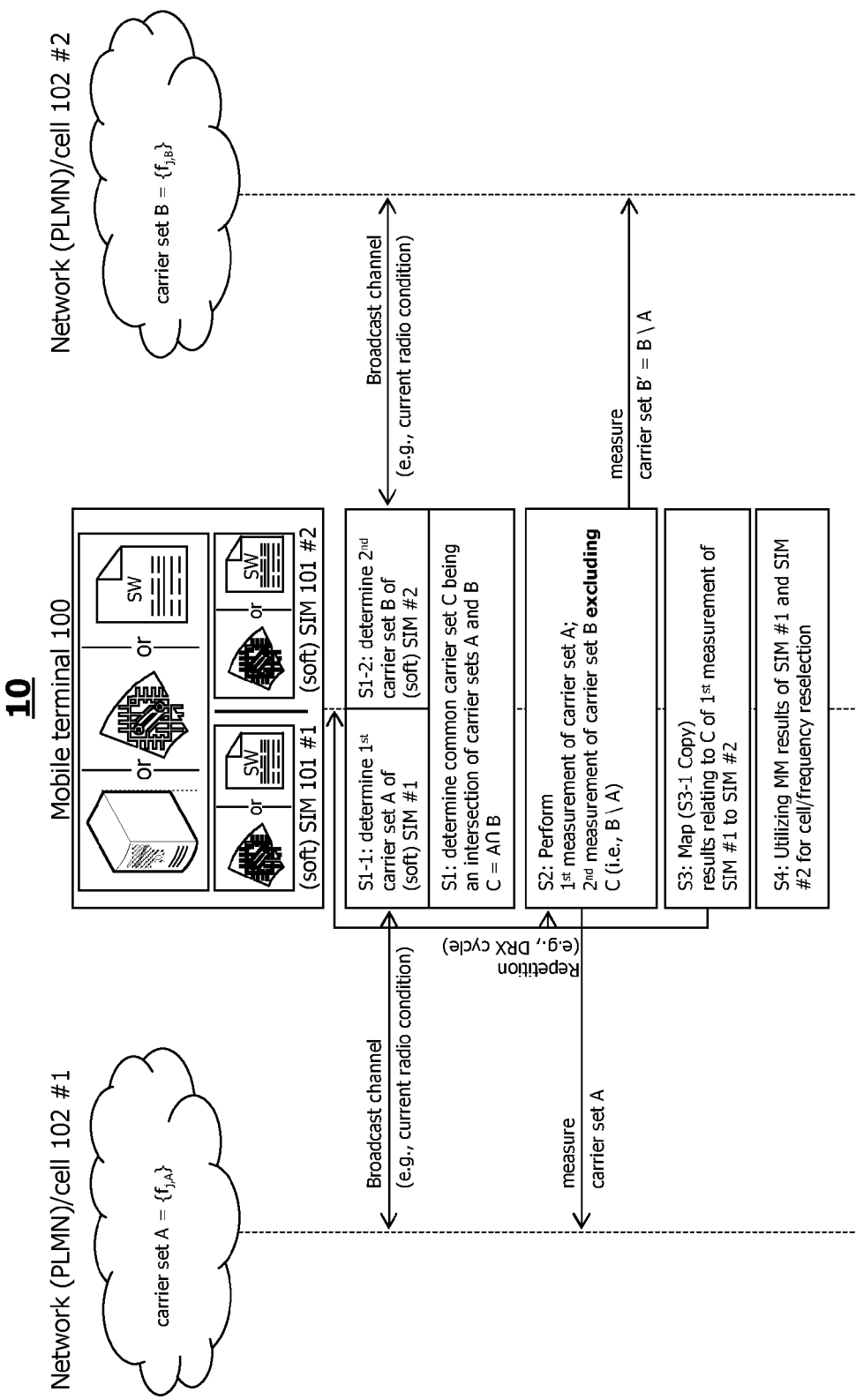

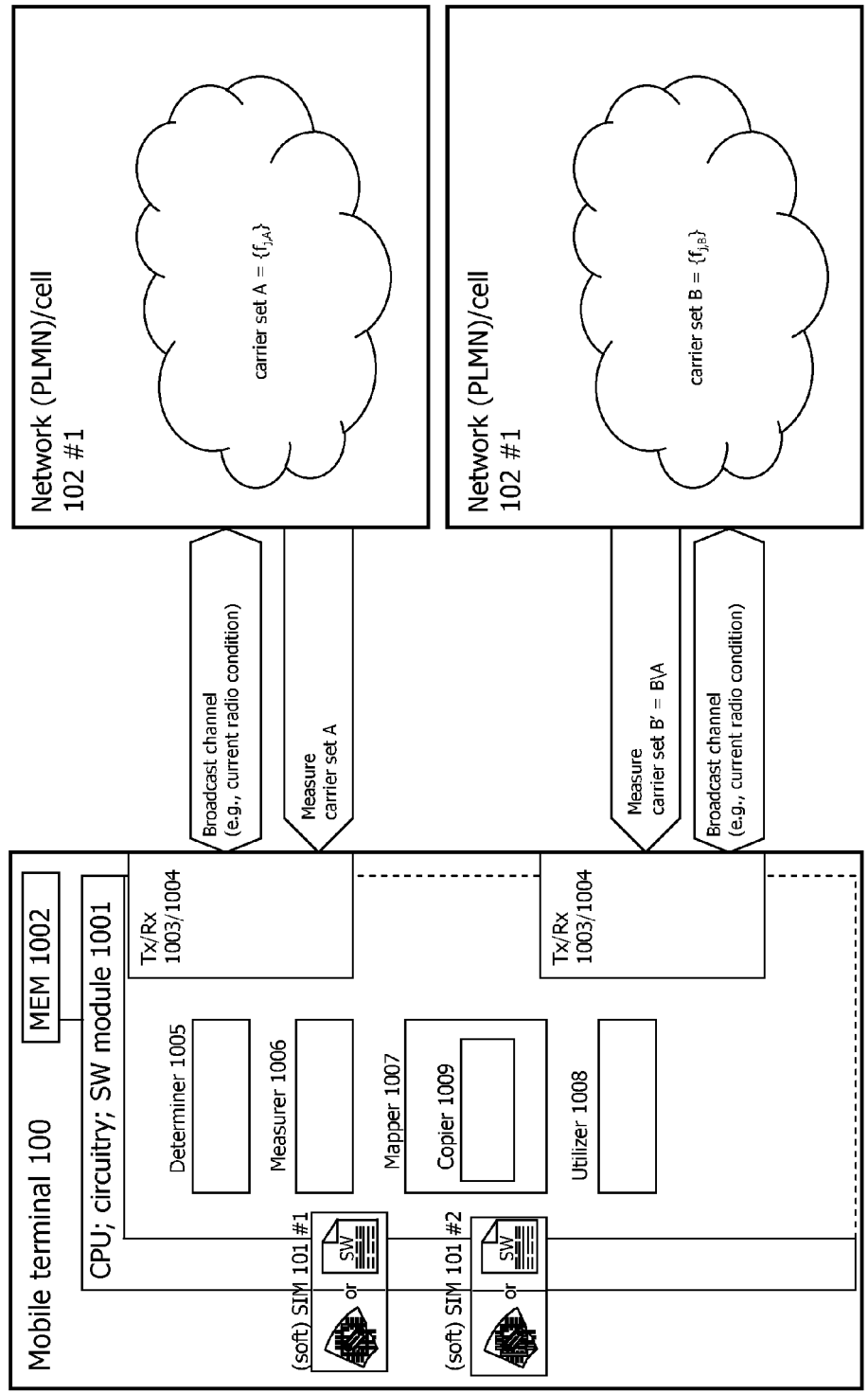

TECHNIQUE FOR MANAGING MEASUREMENTS FOR MULTIPLE SUBSCRIPTIONS IN A MOBILE TERMINAL

TECHNICAL FIELD

The present disclosure relates to a technique for managing measurements for at least two subscriptions in a mobile terminal. The subscriptions may be defined by Subscriber Identity Modules (SIMs).

BACKGROUND

Many of today's mobile terminal users have subscribed to more than one mobile communication service. For instance, such a user could have one private and one work-related subscription. In another case, such a user could have two different subscriptions for use in different areas (e.g., countries).

Accordingly, dual SIM devices become increasingly popular. A dual SIM device is typically realized in the form of a mobile terminal which is capable of holding two SIM cards. Dual SIM operation allows the use of two subscriptions without the need of carrying two mobile terminals. For example, the same mobile terminal can be used for business and private purposes with separate numbers (and bills) or for travel, with an additional SIM for the country visited.

The most common dual SIM devices are those of the dual standby-type, i.e., the device can—in standby—camp on two public land mobile networks (PLMNs) or cells, one for each active SIM. Furthermore, it is expected that multi-standby SIM devices capable of handling more than two SIM cards will be on the market soon.

US 2009/0215452 A1 may be construed to disclose a method and a mobile terminal according to the preambles of claims 1 and 14.

CN 101 198 136 A outlines a cell reselecting method for a dual SIM device. The method may be construed to comprise the following steps: A mobile telephone with dual SIM capabilities tests the signal intensity of adjacent cells corresponding to a SIM #1. If the SIM #1 meets a reselecting condition, a reselecting flow is started. For a SIM #2 a reselecting flow is independently completed. If the two SIMs belong to the same operator, the other SIM can share measurement parameters. This approach ensures that the dual SIM device can simultaneously support the cell reselection of the two SIMs when only one independent GSM communication module exists.

However, dual standby SIM devices not only need to listen on paging for each SIM, but also need to perform cell search and neighbor cell measurements on detected cells for mobility purposes for both PLMNs (i.e., to evaluate possible cell handover candidates). Accordingly, these operations will affect the standby time in idle mode. For instance, assuming the same DRX cycle for both PLMNs the device is camping on, typically a reduction of standby time by 50% is observable compared to a single SIM terminal. This could severely affect the user experience.

US 2009/0093217 A1 may be construed to disclose a channel measurement method for measuring signal strengths on designated channels, and for arranging the channels in an order of the signal strengths.

US 2009/0312020 A1 may be construed to disclose a method for searching/registering a cell in a first and a second network pertaining to a first and a second SIM card, respectively, wherein the searching/registering with the cell of the second network is performed during a non-paging duration of the first network.

CN 101 217 743 A may be construed to disclose a method for searching one and the same network for a first SIM in a mobile phone. Once a second SIM in the mobile phone intends to search the network, the second SIM reads the entire record without further measurement.

WO 03/101140 A1 may be construed to disclose a method for determining a geographic location of a mobile device. When in fingerprinting mode, signals strengths are measured for each available frequency band per location, and a location fingerprint is stored. When in the location mode, the signal strengths of all available frequency bands are measured, the measurement result is matched against the stored fingerprints, and the location is estimated based on the best match.

SUMMARY

The present invention aims at addressing the above issue of reduced standby time, and at addressing further problems.

In a first aspect a method for managing measurements for at least two subscriptions in a mobile terminal is provided, wherein the method is performed in the mobile terminal and comprises the steps of determining a common carrier set being an intersection between a first carrier set associated with a first subscription and a second carrier set associated with at least one second subscription, performing a first measurement on the first carrier set and a second measurement on the second carrier set excluding the common carrier set, and mapping results associated with the first measurement of the first subscription relating to the common carrier set to the at least one second subscription, such that the mobile terminal is configured to reuse the measurements done on the first subscription on the at least one second subscription.

The mapping step may be performed in various ways. The mapping step may make the first measurement of the first subscription relating to the common carrier set available for the at least one second subscription. Accordingly, the first measurement may be re-used in relation to the common carrier set for purposes related to the second subscription.

In one example, the determining step, the performing step and the mapping step are executed on a repetitive basis. Alternatively, only the performing step and the mapping step are executed on a repetitive basis. As an example, the repetitive basis is defined by a discontinuous reception, DRX, cycle. On such a repetitive basis, also subscriptions of the mobile terminal experiencing frequent changes in the radio conditions can be updated in an efficient way.

In another example, the measurements relate to at least one of neighbour cell measurements for the first and second subscriptions and a cell search for the first and second subscriptions. Accordingly, subscription-related parameters may be adapted to the cell structure of the network/cell currently camped on.

Further, at least one of the first subscription and the at least one second subscription may be defined by one of a subscriber identity module, SIM, card and a soft SIM. In the latter example, the subscriptions may be independent of the presence of a physical SIM card.

In still another example, the determining step further comprises a step for determining the first carrier set of the first subscription, and a step for determining the second carrier set of the at least one second subscription. Determination of the first carrier set and determination of the second carrier set may be performed based on a current radio condition of one of a PLMN and a cell. As an example, the current radio condition of the PLMN or cell is determined from at least one broadcast channel of the PLMN or cell. Accordingly, each subscription of the mobile terminal may have its own individual carrier set depending on the current radio conditions.

In a further example, the mapping step comprises a step for copying the results to the at least one second subscription, wherein the at least one second subscription may be defined by one of the SIM card and the soft SIM. Accordingly, the mobile terminal reuses measurements done on the first subscription/SIM on the second subscription/SIM. Thus, a shorter total duty cycle (i.e., ON-time of the transceiver) is possible, and hence the power consumption for the dual SIM terminal in idle mode is reduced. After the mapping step, there may be provided a step for utilizing measurement results of the first and second subscriptions for at least one of cell reselection and frequency reselection for the mobile terminal.

In another aspect, there is provided a computer program product comprising program code portions for performing any of the method aspects presented herein when the computer program product is executed on one or more computing devices. Preferably, the computer program product is stored on a computer readable recording medium.

According to a further aspect, a mobile terminal capable of managing measurements for at least two subscriptions is provided. The mobile terminal comprises a first component adapted to determine a common carrier set being an intersection between a first carrier set associated with a first subscription and a second carrier set associated with at least one second subscription, a second component adapted to perform a first measurement on the first carrier set and a second measurement on the second carrier set excluding the common carrier set, and a third component adapted to map results associated with the first measurement of the first subscription relating to the common carrier set to the at least one second subscription, such that the mobile terminal is configured to reuse the measurements done on the first subscription on the at least one second subscription.

The mobile terminal may comprise further components adapted to perform any of the method steps disclosed herein.

BRIEF DESCRIPTION OF THE DRAWINGS

The embodiments of the present invention are described herein below with reference to the accompanying drawings, in which:

FIG. 1A shows a method for managing measurements for at least two subscriptions in a mobile terminal according to an embodiment;

FIGS. 2A and 2B show an embodiment of an apparatus for managing measurements for at least two subscriptions in a mobile terminal, wherein FIG. 2A shows the components comprised an a mobile terminal according to the embodiment of the present invention; and FIG. 2B shows the interaction between the components of the mobile terminal according to the embodiment of the present invention.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, while the embodiments will primarily be described in the context of dual SIM terminals, it will be evident that the technique presented herein can also be practised in connection with other mobile terminals.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

FIG. 1A illustrates an embodiment of a method for managing measurements for two subscriptions by a mobile terminal 100 in a cellular network 10. The first subscription and/or the second subscription may be defined by a SIM card or a soft SIM. As shown in FIG. 1A, the cellular network 10 comprises, in addition to the mobile terminal 100, a first (#1) network or cell 102 and a second (#2) network or cell 102. The networks 102 may be PLMNs. The mobile terminal 100 comprises a first (soft) SIM 101 and a second (soft) SIM 101.

In the signalling diagram of FIG. 1A, signalling between elements is indicated in the horizontal direction, while time aspects between signalling are reflected in the vertical arrangement of the signalling sequence as well as in the sequence numbers. It is to be noted that the time aspects indicated in FIG. 1A do not necessarily restrict any one of the method steps shown to the step sequence outlined in FIG. 1A. This applies in particular to method steps that are functionally disjunctive with each other.

As shown in FIG. 1A, a first carrier set A is associated with the first network or cell 102 #1, while a second carrier set B is associated with the second network or cell 102 #2. It should be noted that the carrier set A and the carrier set B will typically not be disjunctive. This means that there may exist one or more common carriers belonging to both the carrier set A and the carrier set B.

Figure 1B:
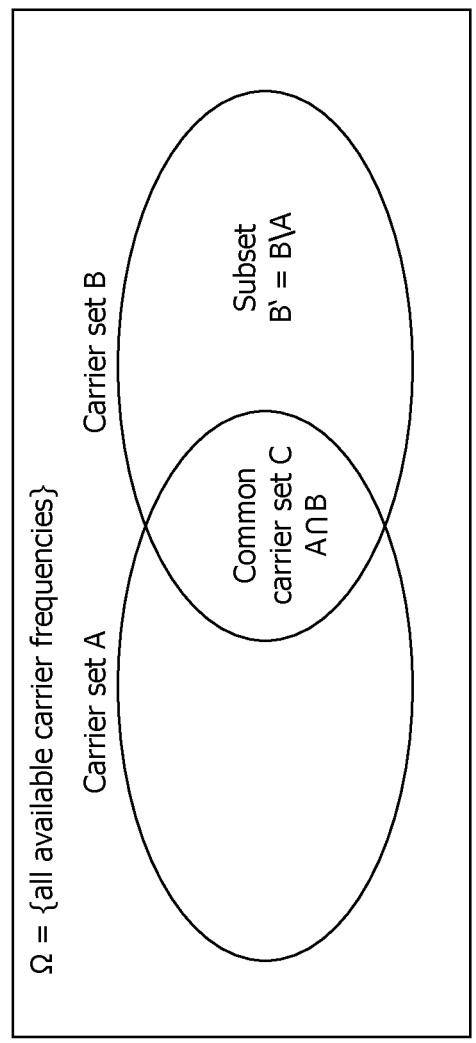
FIG. 1B shows a Venn diagram of the carrier sets involved from the viewpoint of mathematical sets.

FIG. 1B shows a Venn diagram of the carrier sets involved from the viewpoint of mathematical subsets. At the beginning, a total set $\Omega$ being the set of all available carrier frequencies is defined. Therein, the first carrier set A and the second carrier set B are defined. The intersection of sets A and B is defined to be the common carrier set C. Conversely, the set B' is defined to be the difference quantity of set B excluding the elements common to A and B (or, in other words, excluding the common carrier set C), i.e., B'=B\A.

Figure 2B:
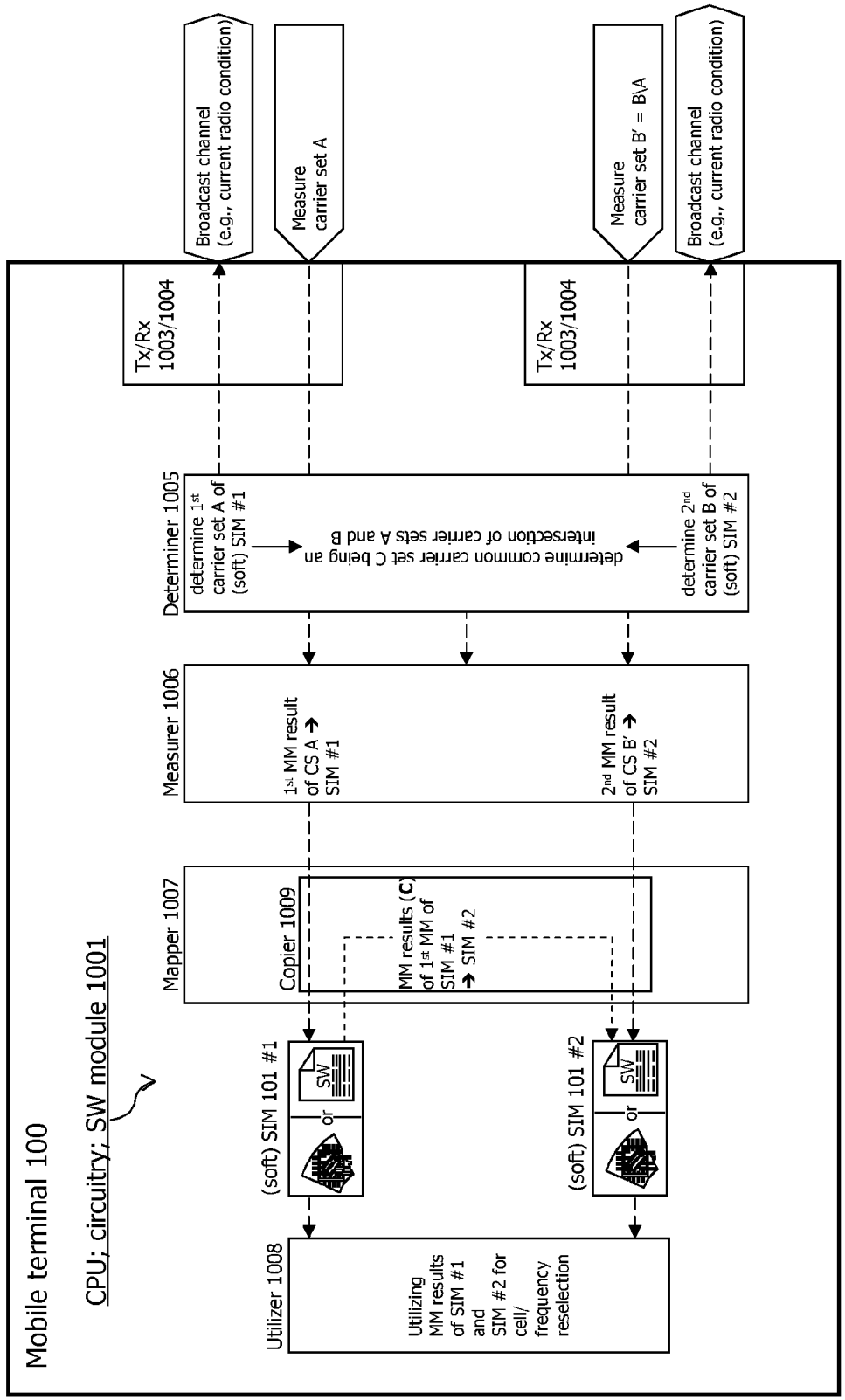

FIGS. 2A and 2B show an embodiment of a dual SIM device (i.e., mobile terminal 100) for managing measurements for at least two subscriptions in accordance with the method embodiment of FIG. 1A. FIG. 2A illustrates the components comprised in the mobile terminal 100, and FIG. 2B shows the interaction between the components of the mobile terminal 100.

As shown in FIG. 2A, the mobile terminal 100 comprises the first and second (soft) SIMs 101 already illustrated in FIG. 1A, a core functionality (e.g. a central processing unit (CPU), a dedicated circuitry or a software module) 1001, a memory (and/or database) 1002, a transmitter 1003, a receiver 1004, a determiner 1005, a measurer 1006, a mapper 1007, a utilizer 1008 and a copier 1009.

As indicated by the dashed extension of the functional block of the CPU 1001, the determiner 1005, the measurer 1006, the mapper 1007, the utilizer 1008 and the copier 1009 (and the component for transmitting 1003 and the component for receiving 1004) may at least partially be functionalities running on the CPU 1001, or may alternatively be separate functional entities or means being controlled by the CPU 1001 and supplying the same with information.

The CPU 1001 may be configured, for example by software residing in the memory 1002, to process various data inputs and to control the functions of the memory 1002, the transmitter 1003 and the receiver 1004 (as well as the determiner 1005, the measurer 1006, the mapper 1007, the utilizer 1008 and the copier 1009). The memory 1002 may serve for storing code means for carrying out the methods according to the aspects disclosed herein, when run on the CPU 1001.

It is to be noted that the transmitter 1003 and the receiver 1004 may alternatively be provided as an integral transceiver. It is further to be noted that the transmitters/receivers may be implemented as physical transmitters/receivers for transceiving via an air interface (e.g., between the mobile terminal 100 and the networks or cells 102), as routing entities (e.g., for transmitting/receiving data packets), as functionalities for writing/reading information into/from a given memory area, as interfaces between network elements, or as any suitable combination of the above. At least one of the above-described components for determining 1005, for measuring 1006, for mapping 1007, for utilizing 1008 and for copying 1009 as well as the entire mobile terminal 100, or the respective functionalities carried out, may also be implemented as a chipset, module or subassembly.

Referring now to the signalling diagram of FIG. 1A, in step S1, the determiner 1005 of the mobile terminal 100 determines a common carrier set (denoted by C) being an intersection between a first carrier set (denoted by A) associated with a first subscription and a second carrier set (denoted by B) associated with at least one second subscription (see also FIG. 1B). In addition, the determination may comprise a step S1-1 (or a component) for determining the first carrier set A of the first subscription, and a step S1-2 (or a component) for determining the second carrier set B of the second subscription. The determination of the first carrier set A and the determination of the second carrier set B may be conducted based on a current radio condition of a respective PLMN (or cell). In this case, the current radio condition of the PLMN may be determined from at least one broadcast channel of the PLMN.

Then, in step S2, the measurer 1006 of the mobile terminal 100 performs a first measurement on the first carrier set A, and a second measurement on the second carrier set B excluding the common carrier set C. That is, the second measurement of the second carrier set excluding the common carrier set may be performed on subset B'=B\A as illustrated in FIG. 1B. The measurements performed in step S2 by the measurer 1006 may relate to at least one of neighbour cell measurements for the first and second subscriptions and a cell search for the first and second subscriptions. In the first case, the neighbour cell measurements may, for instance, comprise measurements of the signal strength or signal-to-noise-ratio (SNR) emanating from one or more neighbouring cells. In the latter case, the cell search may comprise a search for one or more cells currently having a neighbour relationship, e.g., in terms of a certain carrier, to the cell in question; in other words, the cell search for a cell in question comprises, for instance, search for one or more cells sharing the same carrier with the cell in question.

In step S3, the mapper 1007 of the mobile terminal 100 maps results associated with the first measurement of the first subscription relating to the common carrier set (i.e., measurements of the set C) to the at least one second subscription. The mapping may further comprise a step S3-1 or a component 1009 for copying the results to the at least one second subscription.

The determining step S1, the performing step S2 and the mapping step S3 are be conducted on a repetitive basis. Alternatively, only the performing step S2 and the mapping step S3 may be conducted on a repetitive basis. Among others, the repetitive basis may be defined by a DRX (discontinuous reception) cycle.

Finally, after the mapping step S3, in step S4, the utilizer 1008 of the mobile terminal 100 is adapted to utilize the measurement results of the first and second subscriptions. This utilization may relate to at least one of cell reselection and frequency reselection for the mobile terminal.

As has become apparent from the embodiments described hereinabove, the technique presented herein brings about one or more of the following advantages. By determining the (number of) common carrier frequencies of the first and second subscriptions/SIM, by then only performing measurements on these carriers for the first subscription/SIM and by copying the measurement results to the second subscription/SIM, the total length of the duty cycle can be reduced and power can be saved. Thus, the mobile terminal is able to reuse measurements done for a first subscription/SIM for another subscription/SIM. Moreover, multiple physical SIM cards or soft SIMs (i.e. SIM information stored in software) can be managed.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous. Because the technique presented herein can be varied in many ways, it will be recognized that the invention should be limited only by the scope of the claims that follow.

The invention claimed is:

1. A method for managing measurements for at least two subscriptions in a mobile terminal, wherein the method is performed in the mobile terminal and comprises the steps of:
    determining a common carrier set being an intersection between a first carrier set associated with a first subscription and a second carrier set associated with at least one second subscription;
    performing a first measurement on the first carrier set, and a second measurement on the second carrier set excluding the common carrier set; and
    mapping results associated with the first measurement of the first subscription relating to the common carrier set to the at least one second subscription.

2. The method according to claim 1, wherein the performing step and the mapping step are conducted on a repetitive basis.

3. The method according to claim 1, wherein the determining step, the performing step and the mapping step are conducted on a repetitive basis.

4. The method according to claim 3, wherein the repetitive basis is defined by a discontinuous reception (DRX) cycle.

5. The method according to claim 1, wherein the measurements relate to at least one of neighbor cell measurements for the first and second subscriptions and a cell search for the first and second subscriptions.

6. The method according to claim 1, wherein at least one of the first subscription and the at least one second subscription are defined by one of a subscriber identity module (SIM) card and a soft SIM.

7. The method according to claim 1, wherein the determining step further comprises:
   determining the first carrier set of the first subscription; and
   determining the second carrier set of the at least one second subscription.

8. The method according to claim 7, wherein determination of the first carrier set and determination of the second carrier set are conducted based on a current radio condition of one of a public land mobile network (PLMN) and a cell.

9. The method according to claim 8, wherein the current radio condition of the PLMN is determined from at least one broadcast channel of the PLMN.

10. The method according to claim 1, wherein the mapping step further comprises copying the results to the at least one second subscription.

11. The method according to claim 1, further comprising, after the mapping step, utilizing measurement results of the first and second subscriptions for at least one of cell reselection and frequency reselection for the mobile terminal.

12. A computer program product stored in a computer readable recording medium and comprising program code portions that, when executed on one or more computing devices in a mobile terminal, configure the mobile terminal to manage measurements for at least two subscriptions in the mobile terminal, based on configuring the mobile terminal to:
   determine a common carrier set being an intersection between a first carrier set associated with a first subscription and a second carrier set associated with at least one second subscription;
   perform a first measurement on the first carrier set, and a second measurement on the second carrier set excluding the common carrier set; and
   map results associated with the first measurement of the first subscription relating to the common carrier set to the at least one second subscription.

13. A mobile terminal configured to manage measurements for at least two subscriptions, the mobile terminal comprising a processing circuit configured to:
   determine a common carrier set being an intersection between a first carrier set associated with a first subscription and a second carrier set associated with at least one second subscription;
   perform a first measurement on the first carrier set, and a second measurement on the second carrier set excluding the common carrier set; and
   map results associated with the first measurement of the first subscription relating to the common carrier set to the at least one second subscription.

14. The mobile terminal according to claim 13, wherein the processing circuit is configured to determine the common carrier set, perform the first and second measurements and map the results on a repetitive basis.

15. The mobile terminal according to claim 13, wherein the processing circuit is configured to perform the first and second measurements and map the results on a repetitive basis.

16. The mobile terminal according to claim 15, wherein the repetitive basis is defined by a discontinuous reception (DRX) cycle.

17. The mobile terminal according to claim 13, wherein the first and second measurements relate to at least one of neighbour cell measurements for the first and second subscriptions and a cell search for the first and second subscriptions.

18. The mobile terminal according to claim 13, wherein at least one of the first subscription and the at least one second subscription are defined by one of a subscriber identity module (SIM) card and a soft SIM.

19. The mobile terminal according to claim 13, wherein the processing circuit is configured to:
   determine the first carrier set of the first subscription; and
   determine the second carrier set of the at least one second subscription.

20. The mobile terminal according to claim 19, wherein the processing circuit is configured to determine the first carrier set and the second carrier set based on a current radio condition of one of a public land mobile network (PLMN) and a cell.

21. The mobile terminal according to claim 20, wherein the current radio condition of the PLMN is determined from at least one broadcast channel of the PLMN.

22. The mobile terminal according to claim 13, wherein the processing circuit is configured to copy the results to the at least one second subscription.

23. The mobile terminal according to claim 13, wherein the processing circuit is configured to utilize, after the mapping step, measurement results of the first and second subscriptions for at least one of cell reselection and frequency reselection for the mobile terminal.

* * * * *